US006853123B1

United States Patent
Nattermann et al.

(12) United States Patent
(10) Patent No.: US 6,853,123 B1
(45) Date of Patent: Feb. 8, 2005

(54) FLAT LIGHT SOURCE

(75) Inventors: Kurt Nattermann, Ockerheim (DE);
Volker Seibert, Ober-Olm (DE);
Roland Bürkle, Kirchentellinefurt
(DE); Reinhard Kassner, Alfeld (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 09/889,099

(22) PCT Filed: Jan. 11, 2000

(86) PCT No.: PCT/EP00/00147

§ 371 (c)(1),
(2), (4) Date: Oct. 22, 2001

(87) PCT Pub. No.: WO00/42635

PCT Pub. Date: Jul. 20, 2000

(30) Foreign Application Priority Data

Jan. 11, 1999 (DE) .......................... 199 00 713

(51) Int. Cl.⁷ ............................... H01J 17/49
(52) U.S. Cl. .................. 313/483; 313/484; 313/514
(58) Field of Search ................ 313/483–485, 313/489, 513, 514, 522, 567, 568, 572; 428/426, 428, 446–448, 423.1, 336

(56) References Cited

U.S. PATENT DOCUMENTS

| 3,573,072 A | * | 3/1971 | Duke et al. .................. 501/6 |
| 4,227,114 A | | 10/1980 | De Jule |
| 4,332,241 A | | 6/1982 | Dalstein et al. |
| 4,671,814 A | | 6/1987 | Aratani et al. |
| 4,971,887 A | * | 11/1990 | Schmitt et al. ............ 430/165 |
| 5,296,294 A | * | 3/1994 | Suzuki et al. ............. 428/410 |
| 6,124,676 A | * | 9/2000 | Salavin et al. ............ 313/268 |
| 6,246,171 B1 | * | 6/2001 | Vollkommer et al. ....... 313/586 |

FOREIGN PATENT DOCUMENTS

| EP | 782 167 | | 7/1997 |
| EP | 810 452 | | 12/1997 |
| EP | 851 452 | | 7/1998 |
| JP | 2000-357463 A | * | 12/2000 |
| WO | 98/52184 | | 11/1998 |

OTHER PUBLICATIONS

Company brochure, *A Completely New Dimension OSRAM PLANON*, 4 pages, Aug. 1998.

* cited by examiner

Primary Examiner—Nimeshkumar D. Patel
Assistant Examiner—Sharlene Leurig
(74) Attorney, Agent, or Firm—Pauley Petersen & Erickson

(57) ABSTRACT

A flat light source having a front plate and a rear part. The front plate is held at a distance from the rear part by spacers. A gaseous filling which is under a pressure lower than the ambient atmospheric pressure is introduced into the intermediate space between the front plate and rear part, and the front plate is of a glass material. To be able to produce flat light sources of this type which have a low intrinsic weight, according to this invention the front plate and/or the rear part can be configured as an at least partly thermally or chemically tempered glass pane or the front plate and/or the rear part can be configured as a glass pane which at least in areas is coated with ductile polymer material.

14 Claims, 5 Drawing Sheets

FLAT LIGHT SOURCE

BACKGROUND OF THE INVENTION

1. Field of the Invention

This invention relates to a large-area radiator with a front pane and a rear element, wherein the front pane is kept apart from the rear element by spacer elements, a gaseous filler is introduced into the space between the front pane and the rear element and is at a lesser pressure than the pressure of the surrounding atmosphere, and the front pane is made of a glass material.

2. Description of Related Art

Transmissive LCDs require background illumination by a strong light of homogeneous luminance, reduced thickness, low rate of breakage during assembly and handling, and with a great strength over time. Gas discharge lamps with a filling of a noble gas at underpressure meet the requirements of homogeneous luminance and low heat emission. These lamps can also be designed as large-area radiators.

The main mechanical components of such large-area radiators are the front and rear pane and spacer elements for keeping the front and rear panes apart. Front and rear panes made of glass are preferred. It is known to provide rear panes made of glass with reflecting coatings, or foils.

Large-area radiators are known, wherein the discharge current flows through "folded" channels between the front and rear panes, which requires an operating voltage of several hundred Volts (Company Publication "Flat Candle Backlight Products for 4" Diagonal LCD"). Large-area radiators are also known, in which the current flows directly from the rear to the front pane. Such large-area radiators are operated in connection with LCD applications with operating voltages of only approximately 10 V.

A considerable disadvantage of large-area radiators with an underpressure filling is the great thickness and large weight. The thickness is the result of the minimum discharge distance and of the thickness of the glass panes for the front and rear panes. The pane thickness is the result of strength requirements.

Large-area radiators with front and rear panes of approximately 2.5 mm thickness, which are maintained at an essentially even distance of 40 to 50 mm by spacer elements, are known. FIG. 1 shows a section in a perspective view, taken through a known large-area radiator, in which the front and rear pane and parallel, continuous, strip-shaped spacer elements are shown. It is known that when employing thinner glass panes for the front and rear pane, for example for weight-saving or for reducing the thickness of the large-area radiator, the following problems occur: too large mechanical stresses in the panes; too great bending of the panes between spacer elements; and buckling, tipping over or tearing off of the spacer elements.

The mechanical stresses in the panes because of the exterior pressure are considered to be a main problem. The tensile stress at the exterior surfaces of the pane is on a scale of approximately $\sigma \times a(w/t)^2$, wherein t identifies the pane thickness and w the distance between the spacer elements. When the pane thickness is reduced, it is also necessary to reduce the distance between the spacer elements. It is assumed that with a pane thickness t=2.5 mm, a distance between the spacer elements of at least w=40 to 50 mm is required to keep the tensile stress at the exterior surface of the panes below approximately 10 MPa (expected fatigue strength of class). At a pane thickness of 1 mm, a distance between the spacer elements of less than 20 mm would therefore be required. This results in an increased production outlay and a reduction of the light yield because of the many spacer elements. This assumption has prevented the production of large-area radiators with thinner front and rear panes, or with a greater distance between the spacer elements.

SUMMARY OF THE INVENTION

It is one object of this invention to achieve a weight reduction of a large-area radiator of the type mentioned above.

This object of this invention is attained with a front pane and/or a rear pane that are embodied as glass panes, which are at least partially thermally or chemically tempered.

With thermally or chemically tempered glass panes it is possible to achieve considerably greater spacer element distances than with known large-area radiators. Table 1 shows what maximum distance can be obtained for the spacer elements w as a function of the pane thickness t, and what surface pressure tempering must be achieved in the glass panes at least ($\sigma_{vtmin}$).

TABLE 1

| | without coating | | with coating | |
|---|---|---|---|---|
| t (mm) | w (mm) | $\sigma_{v1min}$ (Mpa) | $W_{max}$ (mm) | $\sigma_{v1min}$ (MPa) |
| 2.1 | 105 | 120 | 120 | 120 |
| 1.9 | 85 | 100 | 100 | 100 |
| 1.7 | 68 | 80 | 82 | 80 |
| 1.5 | 52 | 60 | 65 | 60 |

Tempering of more than 100 MPa in thin glass panes can only be achieved with high-stress glass (thermal expansion coefficient $\alpha_{20,300} > 7 \times 10^{-6} 1/°C$.) or with glass with a high $T_G$ ($T_G > 550°$ C.; where $T_G$ is the temperature at which the viscosity of the glass is $10^{13.6}$ dPa). The use of glass with a high $T_G$ has a further advantage that it is possible to subject the large-area radiators to high temperatures during the manufacturing process. Therefore glass with a high $T_G$ is preferred. But the thermal tempering of thin glass panes is still very expensive.

For panes with low stress, or for panes of a thickness of less than 1.5 mm, thermal tempering shows hardly positive effects. Therefore chemical tempering with known methods is preferred.

The combination of chemical tempering and coating with ductile polymer layers here leads to a further increase in strength. Coating must be performed after tempering.

With chemically tempered glass it is possible to achieve considerably greater distances between the spacer elements than with the known large-area radiators, along with a sufficient strength of the large-area radiators. Table 2 shows the distance w between spacer elements which can be achieved as a function of the pane thickness t, and what surface pressure tempering must be achieved in the glass panes at least ($\sigma_{vtmin}$).

TABLE 2

| | without coating | | with coating | |
|---|---|---|---|---|
| t (mm) | w (mm) | $\sigma_{v1min}$ (MPa) | $W_{max}$ (mm) | $\sigma_{v1min}$ (MPa) |
| 1.5 | 95 | 200 | 105 | 200 |
| 1.3 | 81 | 200 | 89 | 200 |

TABLE 2-continued

| | without coating | | with coating | |
|---|---|---|---|---|
| t (mm) | w (mm) | $\sigma_{v1min}$ (MPa) | $W_{max}$ (mm) | $\sigma_{v1min}$ (MPa) |
| 1.1 | 70 | 200 | 76 | 200 |
| 0.9 | 55 | 200 | 61 | 200 |
| 0.7 | 42 | 180 | 46 | 180 |
| 0.5 | 28 | 160 | 32 | 160 |

It was found that the strength of the large-area radiators can be considerably increased if the stability under load of the spacer elements is increased by using wavy spacer elements instead of straight spacer elements.

An object of this invention is also achieved with the front pane and/or the rear element embodied as glass panes, which at least partially have a coating of a ductile polymer material.

BRIEF DESCRIPTION OF THE DRAWINGS

The features of this invention are better understood when this specification is read in view of the drawings, wherein.

DESCRIPTION OF PREFERRED EMBODIMENTS

Large-area radiators with a rectangular base and of an even thickness are used to describe this invention, however, the teaching in accordance with this invention can also be applied to other shapes of large-area radiators. Therefore those are made a part of this invention.

Figure 2:
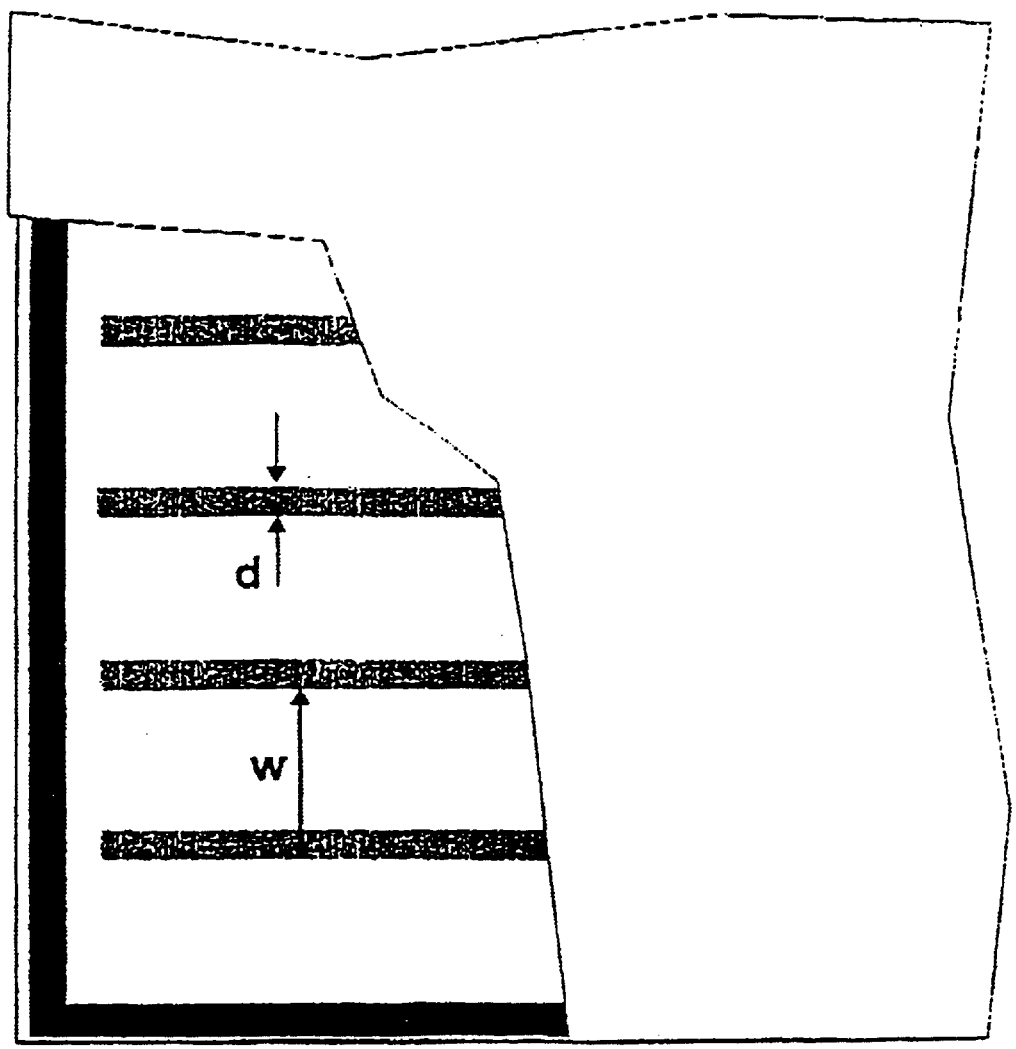
FIG. 2 is a schematic top view and partial sectional view of a large-area radiator having parallel strip-shaped spacer elements.
Figure 3:
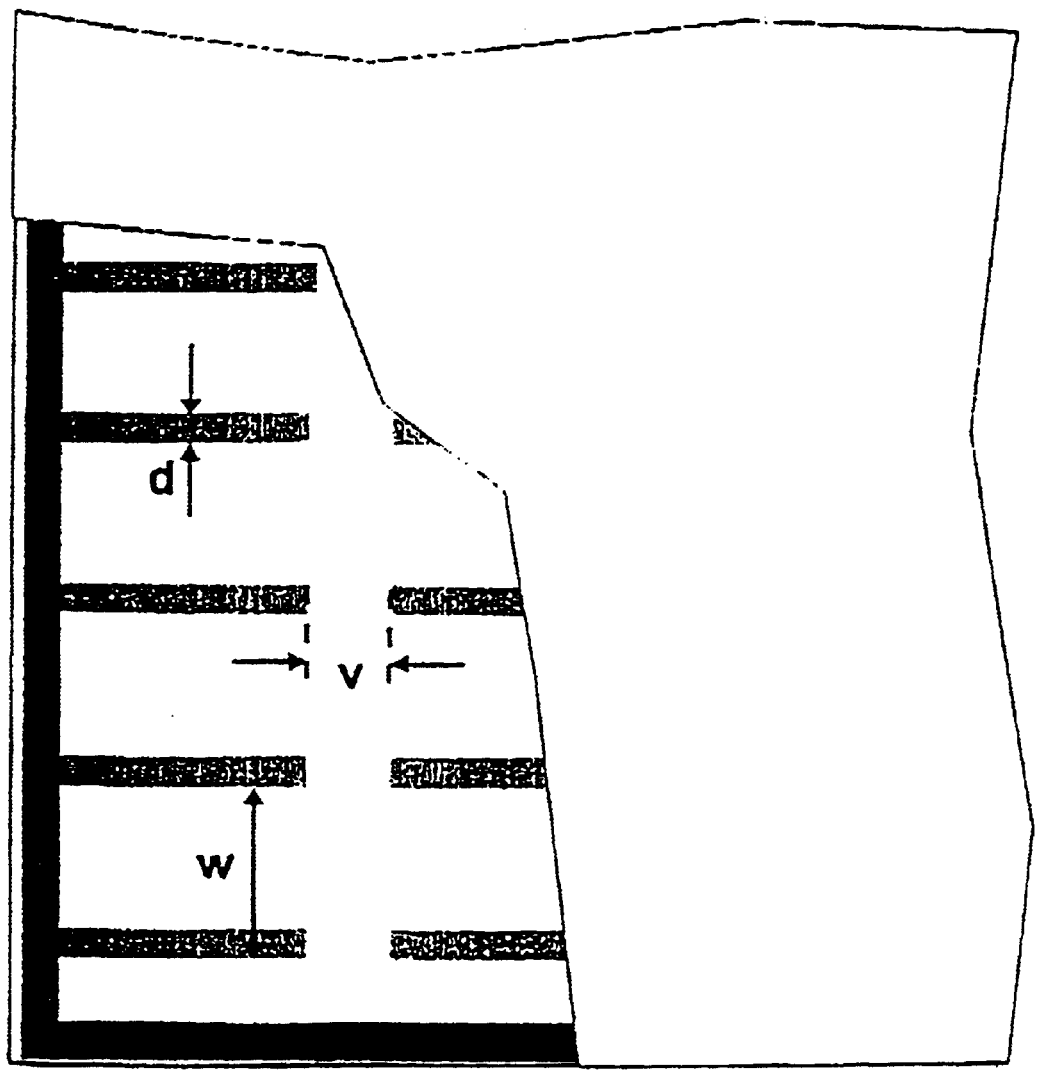
FIG. 3 is a schematic top view and partial sectional view of a large-area radiator having segmented spacer elements.
Figure 4:
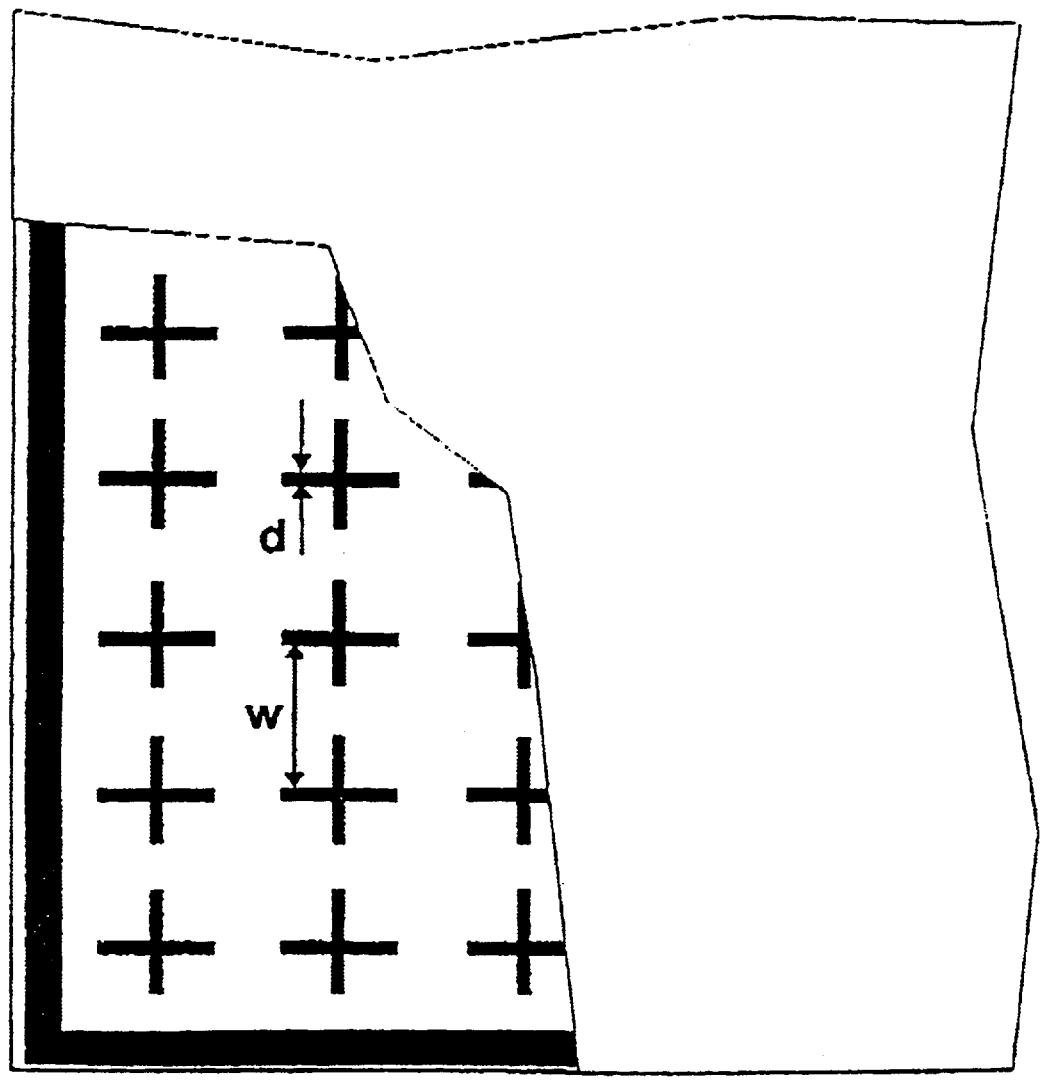
FIG. 4 is a schematic top view and partial sectional view of a large-area radiator having spot spacer elements.

Parallel, strip-like spacer elements, which continuously extend parallel with an edge of the large-area radiator (FIG. 2), are used to describe this invention. However, the teaching in accordance with this invention can also be applied to any other designs, in particular segmented spacer elements (FIG. 3), and spot spacer elements (FIG. 4), or wavy spacer elements (FIG. 5), which are a part of this invention.

It was discovered that a sufficient strength of large-area radiators could also be achieved with front and rear panes of glass of a thickness of less than 2.5 mm, if the glass panes are laminated with plastic coatings.

Tests have shown that with laminating the exterior of the glass panes, used as front and rear panes, with thin, ductile polymer films, a sufficient surface strength of the large-area; radiators is achieved. Suitable for this are thin coatings of silicon, polyurethane or polymers from the group of ormoceres. Because of their high temperature resistance (up to 200° C.) and great resistance to many organic solvents and aqueous solutions, silicon coatings are preferred.

The polymer films already become effective at coating thicknesses starting at approximately 6 $\mu$m. The stability increasing effects of the coatings basically increase with increasing thickness. However, starting at a thickness of 50 $\mu$m this increase is no longer significant. The thickness range between 6 to 50 $\mu$m is preferred, because then the elasticity of the bond is little reduced and the shrinkage of the polymer films leads to only small stresses in the glass panes. However, the application of thicker coatings up to approximately 200 $\mu$m can be useful for manufacturing reasons.

It is possible to employ primers for improving the adherence of the mainly homopolar polymers on the polar glass surface which, by a reactive bond of OH groups on the glass surface with their homopolar side chains, provide a homopolar glass surface with good adhesive properties for homopolar organic polymers. Dimethoxydimethyx silane or hexamethyl disilazane, for example, are suitable primers.

The stability-increasing effect of the polymer coatings actually is a stability conservation. The coatings prevent the creation of stability-reducing micro-defects in the surface of the glass panes during transport, assembly or handling of the glass panes. This effect therefore is particularly developed when the coatings are applied early, preferably immediately following the drawing of the glass panes, and even more preferred prior to cutting the glass panes, for example for fabricating the panes in the size of large-area radiators.

With the above described glass panes it is possible to achieve considerably greater distances between spacer elements than with the known large-area radiators, without their strength being reduced. Table 3 shows, by way of example, which distances w between spacer elements can be achieved as a function of the pane thickness t.

TABLE 3

| t (mm) | w (mm) |
|---|---|
| 2.1 | 75 |
| 1.9 | 65 |
| 1.7 | 54 |
| 1.5 | 48 |
| 1.3 | 37 |
| 1.1 | 31 |
| 0.9 | 25 |
| 0.7 | 20 |

An advantageous variation can result if the polymer coating is applied at a temperature above the operating temperature of the large-area radiator. With this the polymer coating on the pane is under permanent compressive strain and is therefore scratch-proof.

Coatings with polymers have one disadvantage that the coated glass panes may not be exposed to high temperatures during subsequent thermal treatment. The temperature must remain clearly below 200° C. as a rule. This limitation is unacceptable if, for example, the panes must be soldered while mounting the large-area radiator, or if gettering must be performed on mounted large-area radiators.

In this case, the panes can be advantageously sealed with a removable protective film immediately following their production. This temporary protective film is washed off prior to the respective temperature treatment. Thereafter, another temporary sealing takes place, if required, or there is the immediate application of the permanent coatings in accordance with this invention.

Tests show that it is possible to create a thermal tempering of panes starting from a thickness of 1.5 mm by strongly blowing cold air against them or dipping them into oil, or oil-covered water, which considerably increases the stability of the large-area radiators. Thermal tempering should take place after cutting the glass panes, for example for fabricating the panes in the size of large-area radiators.

The combination of thermal tempering and coating with ductile polymer layers results in a further increase of stability. Coating must occur after tempering.

This invention is explained in greater detail in view of two embodiments:

Embodiment 1

The rear pane of a large-area radiator, which itself is finished and capable of functioning, is sprayed with a thin coat of a two-component silicon polymer after the last baking process, so that a continuous wetting layer is created. The layer is then polymerized. The amount of silicon polymer is set so that a polymer coating of 40 to 45 $\mu$m thickness results.

Embodiment 2

A large-area radiator of 320×360 mm size is to be provided with a a chemically tempered front pane of 1.1 mm thickness. Glass D263, for example DESAG AG of Grünenplan, is used for the front pane. 1.1 mm thick panes made of this glass are dipped for 16 h in a hot $KNO_3$ bath at 450° C. in order to temper them by the "Na —K exchange". By means of this, tempering of more than 230 MPa is created in a surface layer to a depth of 80 $\mu$m. It was observed that, in the subsequent processes in the course of producing the large-area radiator, a portion of the tempering was "washed out" again, but tempering of more than 200 MPa was observed to be a permanent value.

Flat Light Source

The invention relates to a large-area radiator with a front pane and a rear element, wherein the front pane is kept apart from the rear element by means of spacer elements, wherein a gaseous filler has been introduced into the space between the front pane and the rear element and is at a lesser pressure than the pressure of the surrounding atmosphere, and wherein the front pane is made of a glass material.

Transmissive LCDs require background illumination by a strong light of homogeneous luminance, reduced thickness, low rate of breakage during assembly and handling, and with a great strength over time. Gas discharge lamps with a filling of a noble gas at underpressure meet the requirements of homogeneous luminance and low heat emission. These lamps can also be designed as large-area radiators.

The essential mechanical components of such large-area radiators are the front and rear pane and spacer elements for keeping the front and rear panes apart. Front and rear panes made of glass are preferred. It is known to provide rear panes made of glass with reflecting coatings, or Larger-area radiators are known in the prior art, wherein the discharge current flows through "folded" channels between the front and rear panes, which requires an operating voltage of several hundred Volts (Company Publication "Flat Candle Backlight Products for 4" Diagonal LCD"). Large-area radiators are also known, in which the current flows directly from the rear to the front pane. Such large-area radiators are operated in connection with LCD applications with operating voltages of only approximately 10 V.

A considerable disadvantage of large-area radiators with an underpressure filling is the great thickness and large weight. The thickness is the result of the minimum discharge distance and of the thickness of the glass panes for the front and rear panes. The pane thickness is the result of strength requirements.

Figure 1:
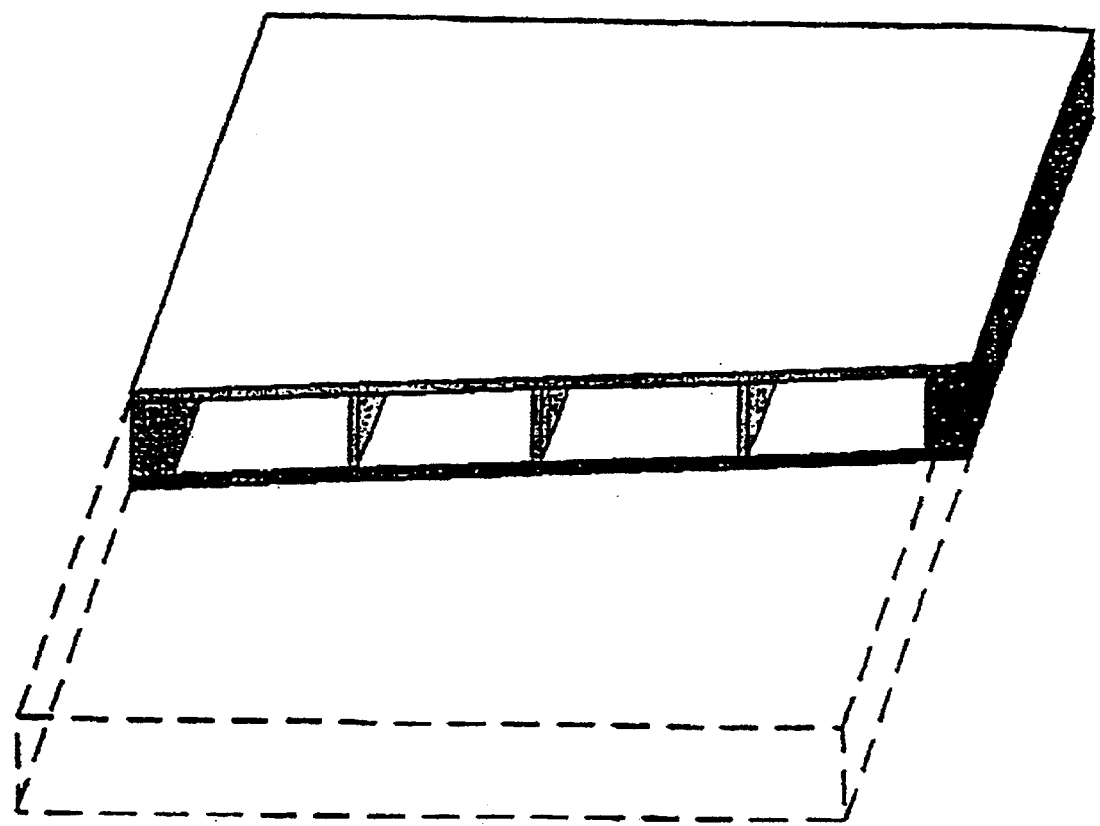
FIG. 1 is a sectional perspective view of a large-area radiator having parallel strip-shaped spacer elements.

Large-area radiators with front and rear panes of approximately 2.5 mm thickness, which are maintained at an essentially even distance of 40 to 50 mm by spacer elements, represent the prior art. FIG. 1 shows a section in a perspective view through a known large-area radiator, in which the front and rear pane and parallel, continuous, strip-shaped spacer elements can be seen. It has been shown that when employing thinner glass panes for the front and rear pane, for example for weight-saving or for reducing the thickness of the large-area radiator, the following problems occur:

a too large mechanical stresses in the panes, too great bending of the panes between spacer elements, buckling, tipping over or tearing off of the spacer elements.

The mechanical stresses in the panes because of the exterior pressure are considered to be an essential problem. The tensile stress at the exterior surfaces of the pane is on a scale of approximately $\sigma \times a(w/t)^2$, wherein t identifies the pane thickness and w the distance between the spacer elements. It can be seen that when the pane thickness is reduced, it is also necessary to reduce the distance between the spacer elements. It is assumed that with a pane thickness t=2.5 mm, a distance between the spacer elements of at least w=40 to 50 mm is required to keep the tensile stress at the exterior surface of the panes below approximately 10 MPa (expected fatigue strength of class). At a pane thickness of 1 mm, a distance between the spacer elements of less than 20 mm would therefore be required. This results in an increased production outlay and a reduction of the light yield because of the many spacer elements. This assumption has up to now prevented the production of large-area radiators with thinner front and rear panes, or with a greater distance between the spacer elements.

It is the object of the invention to achieve a weight reduction of a large-area radiator of the type mentioned at the outset.

This object of the invention is attained in that the front pane and/or the rear pane are embodied as glass panes, which are at least partially thermally or chemically tempered.

By means of thermally or chemically tempered glass panes it is possible to achieve considerably greater spacer element distances than with known large-area radiators. Table 1 shows what maximum distance can be obtained for the spacer elements w as a function of the pane thickness t, and what surface pressure tempering must be achieved in the glass panes at least ($\sigma_{v1min}$).

TABLE 1

| | without coating | | with coating | |
|---|---|---|---|---|
| t (mm) | w (mm) | $\sigma_{v1min}$ (MPa) | $W_{max}$ (mm) | $\sigma_{v1min}$ (MPa) |
| 2.1 | 105 | 120 | 120 | 120 |
| 1.9 | 85 | 100 | 100 | 100 |
| 1.7 | 68 | 80 | 82 | 80 |
| 1.5 | 52 | 60 | 65 | 60 |

Tempering of more than 100 MPa in thin glass panes can only be achieved with high-stress glass (thermal expansion coefficient $\sigma_{20,300}>7\times10^{-6}1/°$ C.) or with glass with a high $T_G$ ($T_G>550°$ C.; $T_G$ is the temperature at which the viscosity of the glass is $10^{13.6}$ dPa). The use of glass with a high $T_G$ has the further advantage that it is then possible to subject the large-area radiators to high temperatures during the manufacturing process. Therefore glass with a high $T^G$ is preferred. But the thermal tempering of thin glass panes is still very expensive.

For panes with low stress, or for panes of a thickness of less than 1.5 mm, thermal tempering shows hardly positive effects. Therefore chemical tempering by means of the methods known per se is preferred.

The combination of chemical tempering and coating with ductile polymer layers here leads to a further increase in strength. Coating must be performed after tempering.

With chemically tempered glass it is possible to achieve considerably greater distances between the spacer elements than with the known large-area radiators, along with a sufficient strength of the large-area radiators. Table 2 shows the distance w between spacer elements which can be achieved as a function of the pane thickness t, and what surface pressure tempering must be achieved in the glass panes at least ($\sigma_{v1min}$).

TABLE 2

| t (mm) | without coating | | with coating | |
|---|---|---|---|---|
| | w (mm) | $\sigma_{v1min}$ (MPa) | $W_{max}$ (mm) | $\sigma_{v1min}$ (MPa) |
| 1.5 | 95 | 200 | 105 | 200 |
| 1.3 | 81 | 200 | 89 | 200 |
| 1.1 | 70 | 200 | 76 | 200 |
| 0.9 | 55 | 200 | 61 | 200 |
| 0.7 | 42 | 180 | 46 | 180 |
| 0.5 | 28 | 160 | 32 | 160 |

It was found that the strength of the large-area radiators can be considerably increased if the stability under load of the spacer elements is increased by using wavy spacer elements instead of straight spacer elements.

The object of the invention is also attained in that the front pane and/or the rear element are embodied as glass panes, which are at least partially provided with a coating consisting of a ductile polymer material.

Large-area radiators with a rectangular base and of even thickness are made the basis for describing the invention, however, the teaching in accordance with this invention can also be applied to other shapes of large-area radiators. Therefore those are made a part of the invention.

Figure 5:
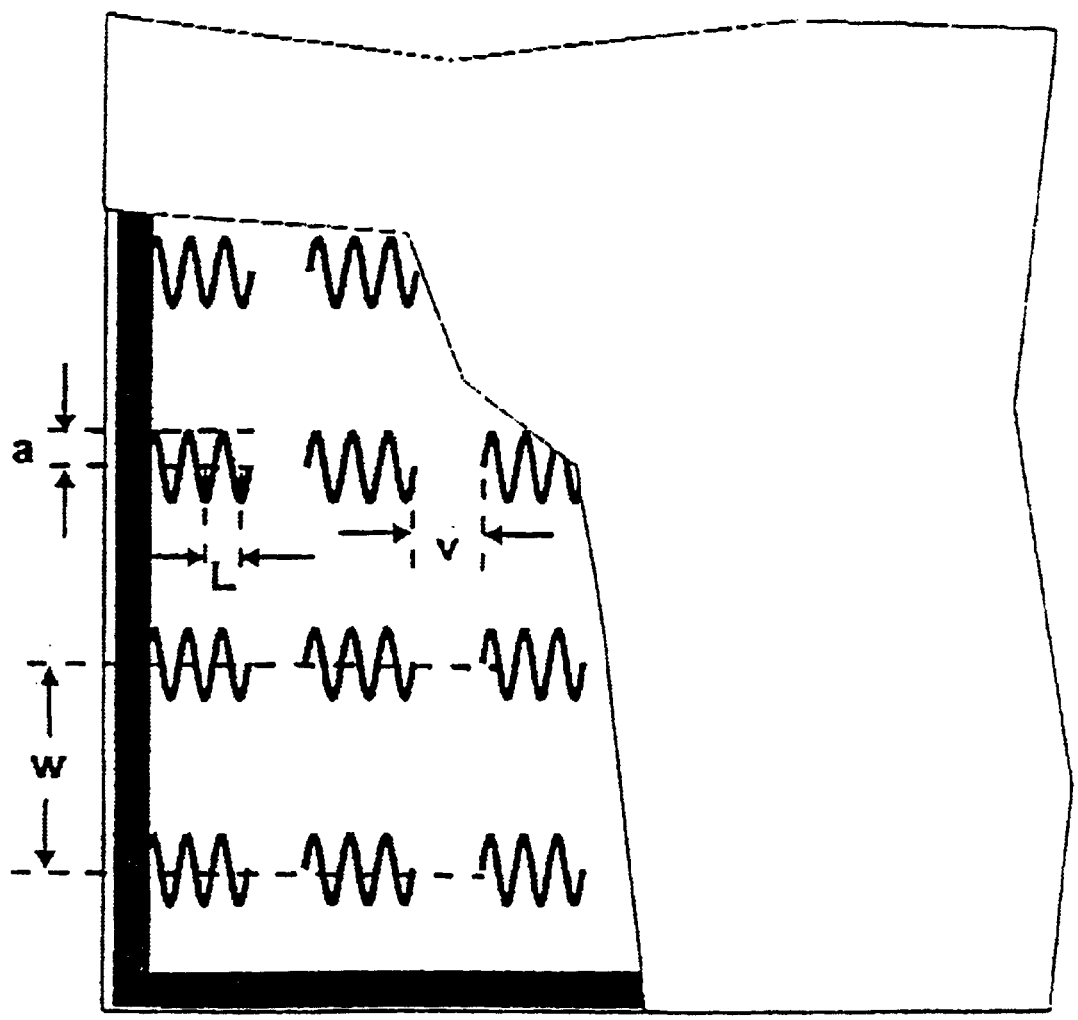
FIG. 5 is a schematic top view and partial sectional view of a large-area radiator having wavy spacer elements.

Parallel, strip-like spacer elements, which continuously extend parallel with an edge of the large-area radiator, are made the basis for describing the invention. However, the teaching in accordance with this invention can also be applied to any other designs, in particular segmented spacer elements (FIG. 3), and spot spacer elements (FIG. 4), or wavy spacer elements (FIG. 5). Therefore those are made a part of the invention.

It was discovered that a sufficient strength of large-area radiators could also be achieved with front and rear panes of glass of a thickness of less than 2.5 mm, if the glass panes are laminated with plastic coatings.

Tests have shown that by means of laminating the exterior of the glass panes used as front and rear panes with thin, ductile polymer films a sufficient surface strength of the large-area radiators is achieved. Suitable for this are thin coatings of silicon, polyurethane or polymers from the group of ormoceres. Because of their high temperature resistance (up to 200° C.) and great resistance to many organic solvents and aqueous solutions, silicon coatings are preferred.

The polymer films already become effective at coating thicknesses starting at approximately 6 µm. The stability-increasing effects of the coatings basically increase with increasing thickness. However, starting at a thickness of 50 µm this increase is no longer significant. The thickness range between 6 to 50 µm is preferred, because then the elasticity of the bond is little reduced and the shrinkage of the polymer films leads to only small stresses in the glass panes. However, the application of thicker coatings up to approximately 200 µm can be useful for manufacturing reasons.

It is additionally possible to employ primers for improving the adherence of the mainly homopolar polymers on the polar glass surface which, by a reactive bond of OH groups on the glass surface with their homopolar side chains, provide a homopolar glass surface with good adhesive properties for homopolar organic polymers. Dimethoxydimethyx silane or hexamethyl disilazane, for example, are suitable primers.

The stability-increasing effect of the polymer coatings actually is a stability conservation. The coatings prevent the creation of stability-reducing micro-defects in the surface of the glass panes during transport, assembly or handling of the glass panes. This effect therefore is particularly developed when the coatings are applied early, preferably immediately following the drawing of the glass panes, and even more preferred prior to cutting the glass panes (for example for fabricating the panes in the size of large-area radiators).

By means of the above described glass panes it is possible to achieve considerably greater distances between spacer elements than with the known large-area radiators, without their strength being reduced. Table 3 shows by way of example what distances w between spacer elements can be achieved as a function of the pane thickness t.

TABLE 3

| t (mm) | w (mm) |
|---|---|
| 2.1 | 75 |
| 1.9 | 65 |
| 1.7 | 54 |
| 1.5 | 48 |
| 1.3 | 37 |
| 1.1 | 31 |
| 0.9 | 25 |
| 0.7 | 20 |

An advantageous variation can result if the polymer coating is applied at a temperature which lies above the operating temperature of the large-area radiator. By means of this it is achieved that the polymer coating on the pane is under permanent compressive strain and is therefore scratch-proof.

Coatings with polymers have the disadvantage that the coated glass panes may not be exposed to high temperatures in the course of subsequent thermal treatment. The temperature must remain clearly below 200° C. as a rule. This limitation is unacceptable if, for example, the panes must be soldered in the course of mounting the large-area radiator, or if gettering must be performed on mounted large-area radiators.

In this case it is possible to make use of the advantages of the invention by sealing the panes with a removable protective film immediately following their production. This temporary protective film is washed off prior to the respective temperature treatment. Thereafter, another temporary sealing takes place, if required, or the immediate application of the permanent coatings in accordance with the invention.

Tests show that it is possible to create a thermal tempering of panes starting from a thickness of 1.5 mm by strongly blowing cold air against them or dipping them into oil, or oil-covered water, which considerably increases the stability of the large-area radiators. Thermal tempering should take place after cutting the glass panes (for example for fabricating the panes in the size of large-area radiators).

The combination of thermal tempering and coating with ductile polymer layers results in a further increase of stability. Coating must take place after tempering.

The invention will be explained in greater detail in what follows by means of two exemplary embodiments:

Exemplary Embodiment 1

The rear pane of a large-area radiator, which itself is already finished and capable of functioning, is sprayed with a thin coat of a two-component silicon polymer after the last baking process, so that a continuous wetting layer is created. The layer is then polymerized. The amount of silicon polymer is set in such a way that a polymer coating of 40 to 45 $\mu$m thickness results.

Exemplary Embodiment 2

A large-area radiator of 320×360 mm size is to be provided with a chemically tempered front pane of 1.1 mm thickness. Glass D263 (reference: DESAG AG of Grünenplan) is used for the front pane. 1.1 mm thick panes made of this glass are dipped for 16 h in a hot $KNO_3$ bath at 450° C. in order to temper them by the "Na —K exchange". By means of this, tempering of more than 230 MPa is created in a surface layer to a depth of 80 $\mu$m. It was observed that, in the subsequent processes in the course of producing the large-area radiator, a portion of the tempering was "washed out" again, but tempering of more than 200 MPa was observed to be a permanent value.

What is claimed is:

1. In a large-area radiator of homogeneous luminance with a front pane and a rear element, wherein spacer elements extending from the front pane to the rear element include one end in contact with the front pane and an opposing end in contact with the rear element to keep the front pane apart from the rear element, a gaseous filler is introduced into a space between the front pane and the rear element and is at a lesser pressure than a pressure of a surrounding atmosphere, and the front pane is made of a glass material, the improvement comprising:

at least one of the front pane and the rear element at least partially of one of a thermally tempered glass pane and a chemically tempered glass pane;

wherein at least one of a measurement of a wall thickness of at least one of the front pane and the rear element is 0.5 mm to 2.1 mm, and is tempered by a chemical tempering of more than 160 MPa.

2. In a large-area radiator of homogeneous luminance with a front pane and a rear element, wherein spacer elements extending from the front pane to the rear element include one end in contact with the front pane and an opposing end in contact with the rear element to keep the front pane apart from the rear element, a gaseous filler is introduced into a space between the front pane and the rear element and is at a lesser pressure than a pressure of a surrounding atmosphere, and the front pane is made of a glass material, the improvement comprising:

at least one of the front pane and the rear element each embodied as a glass pane which at least partially has a coating of a ductile polymer material, wherein at least one of a measurement of a wall thickness of at least one of the front pane and the rear element is less than 2.1 mm.

3. In the large-area radiator in accordance with claim 2, wherein the coating is a film including one of a silicon, a polyurethane and a polymer material, selected from a group of ormoceres.

4. In the large-area radiator in accordance with claim 3, wherein the coating has a thickness of more than 6 $\mu$m.

5. In the large-area radiator in accordance with claim 4, wherein the thickness of the coating is within a range of 6 $\mu$m and 50 $\mu$m.

6. In the large-area structure in accordance with claim 5, wherein a primer is used for bonding the coating to a surface of the glass pane, and the primer is one of a dimethoxydimethyl silane and a hexamethyl disilazane.

7. In the large-area radiator in accordance with claim 6, wherein the glass pane is at least partially tempered one of thermally and chemically.

8. In the large-area radiator in accordance with claim 7, wherein the spacer elements are wavy and are arranged between the front pane and the rear element, wherein a wavy line extends generally parallel with a planar extension of the front pane.

9. In the large-area radiator in accordance with claim 2, wherein the coating has a thickness of more than 6 $\mu$m.

10. In the large-area structure in accordance with claim 2, wherein a primer is used for bonding the coating to a surface of the glass pane, and the primer is one of a dimethoxydimethyl silane and a hexamethyl disilazane.

11. In the large-area radiator in accordance with claim 2, wherein the glass pane is at least partially tempered one of thermally and chemically.

12. In a large-area radiator of homogeneous luminance with a front pane and a rear element, wherein spacer elements extending from the front pane to the rear element include one end in contact with the front pane and an opposing end in contact with the rear element to keep the front pane apart from the rear element, a gaseous filler is introduced into a space between the front pane and the rear element and is at a lesser pressure than a pressure of a surrounding atmosphere, and the front pane is made of a glass material, the improvement comprising:

at least one of the front pane and the rear element at least partially of one of a thermally tempered glass pane and a chemically tempered glass pane;

wherein at least one of a measurement of a wall thickness of at least one of the front pane and the rear element is 1.5 mm to 2.1 mm and a thermal tempering is greater than or equal to 60 Mpa.

13. In the large-area radiator in accordance with claim 12, wherein a temperature at which a viscosity of the glass material of at least one of the front pane and the rear element is 13.6 dPas (TG temperature) is greater than 550°.

14. In the large-area radiator in accordance with claim 12, wherein the spacer elements are wavy and are arranged between the front pane and the rear element, wherein a wavy line extends generally parallel with a planar extension of the front pane.

* * * * *